United States Patent
Koons et al.

(10) Patent No.: US 10,055,903 B2
(45) Date of Patent: Aug. 21, 2018

(54) VEHICLE HEALTH CHECK VIA NOISE AND VIBRATION LEVEL

(71) Applicant: GM GLOBAL TECHNOLOGY OPERATIONS LLC, Detroit, MI (US)

(72) Inventors: Douglas R. Koons, Brighton, MI (US); Joshua R. Auden, Brighton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 48 days.

(21) Appl. No.: 15/177,705

(22) Filed: Jun. 9, 2016

(65) Prior Publication Data

US 2017/0358151 A1 Dec. 14, 2017

(51) Int. Cl.
*G07C 5/08* (2006.01)
*G01H 1/00* (2006.01)
*G05D 1/00* (2006.01)

(52) U.S. Cl.
CPC ............... *G07C 5/08* (2013.01); *G01H 1/00* (2013.01); *G05D 1/0088* (2013.01)

(58) Field of Classification Search
CPC ........ G07C 5/08; G07C 5/0816; G07C 5/041; G05D 1/0088; G05D 1/021; G05D 1/055; B60W 30/08; B60W 30/186; G01H 1/00
See application file for complete search history.

(56) References Cited

U.S. PATENT DOCUMENTS

| | | | | |
|---|---|---|---|---|
| 7,487,679 B2* | 2/2009 | Sirrine | ................... | G01H 1/003 702/39 |
| 8,874,305 B2* | 10/2014 | Dolgov | ............... | G05D 1/0214 701/25 |
| 2006/0052921 A1* | 3/2006 | Bodin | ................ | B60R 16/0232 705/1.1 |
| 2006/0265154 A1* | 11/2006 | Potts | ..................... | G01M 1/225 702/56 |
| 2007/0159314 A1* | 7/2007 | Zhu | ..................... | B60C 23/0408 340/442 |
| 2010/0082274 A1* | 4/2010 | Son | ......................... | G01H 1/00 702/56 |
| 2015/0363983 A1* | 12/2015 | Cunnings | ............ | G01M 17/007 701/29.1 |
| 2017/0154481 A1* | 6/2017 | Chen | .................... | G07C 5/0841 |

* cited by examiner

*Primary Examiner* — Abby Y Lin
(74) *Attorney, Agent, or Firm* — Cantor Colburn LLP

(57) ABSTRACT

Technical solutions are described for autonomously monitoring health of a vehicle, such as a car, a truck and so on. An example computer-implemented method includes receiving sensor data of the vehicle. For example, the sensor data includes vibration data and microphone data. The vibration data measures vibration experienced by an occupant of the vehicle. The microphone data measures noises experienced by the occupant, including noises emanated by the vehicle. The method further includes accessing a predetermined performance data of the vehicle and determining a difference in the received sensor data and the predetermined performance data. The method further includes transmitting a notification of condition of the vehicle in response to the difference surpassing a predetermined threshold.

20 Claims, 5 Drawing Sheets

VEHICLE HEALTH CHECK VIA NOISE AND VIBRATION LEVEL

TECHNICAL FIELD

The present disclosure relates to vehicle health monitoring, and more particularly to analyzing a vehicle's health based on noise and vibration sensors of the vehicle.

BACKGROUND

Noise and vibration of a vehicle, such as automobiles and trucks, may include interior noise and vibration characteristics, and exterior noise and vibration characteristics. The internal noise and vibration characteristics include noise and vibration experienced by occupants of a cabin of the vehicle, while the exterior noise and vibration characteristics are concerned with the noise and vibration radiated by the vehicle, such as drive-by noise. The exterior noise performance issues can also generate undesirable interior noise and vibration for the occupants, for example, a damaged or degraded exhaust system, because of a hole in the muffler, generates noise and vibration concerns inside the vehicle. The noise and vibration of the vehicle may affect satisfaction of the occupants, such as the driver and passenger, and in turn affect the ownership experience of the vehicle

SUMMARY

According to one or more exemplary embodiments, a computer-implemented method for autonomously monitoring health of a vehicle includes receiving a vibration data of the vehicle, where the vibration data includes measurements of vibration experienced by one or more component of the vehicle. The computer-implemented method also includes accessing a predetermined vibration performance data of the vehicle. The computer-implemented method also includes determining a difference in the received vibration data and the predetermined vibration performance data. The computer-implemented method also includes transmitting a notification of a condition of the vehicle in response to the difference surpassing a predetermined threshold.

According to one or more exemplary embodiments, an apparatus for autonomously monitoring health of a vehicle includes a memory, a communication interface, and a processor communicably coupled with the memory and the communication interface. The processor receives vibration data of the vehicle, where the vibration data includes measurements of vibration of one or more components of the vehicle. The processor also accesses a predetermined vibration performance data of the vehicle. The processor also determines a difference in the received vibration data and the predetermined vibration performance data. The processor also transmits a notification of a condition of the vehicle in response to the difference surpassing a predetermined threshold.

According to one or more exemplary embodiments, a computer-program product for autonomously monitoring health of a vehicle includes a computer readable storage medium, where the computer readable storage medium includes computer executable instructions to receive vibration data of the vehicle, where the vibration data includes measurements of vibration experienced by an occupant of the vehicle. The computer readable storage medium further includes instructions to access a predetermined vibration performance data of the vehicle. The computer readable storage medium further includes instructions to determine a difference in the received vibration data and the predetermined vibration performance data. The computer readable storage medium further includes instructions to transmit a notification of a condition with the vehicle in response to the difference surpassing a predetermined threshold.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DETAILED DESCRIPTION

Figure 1:
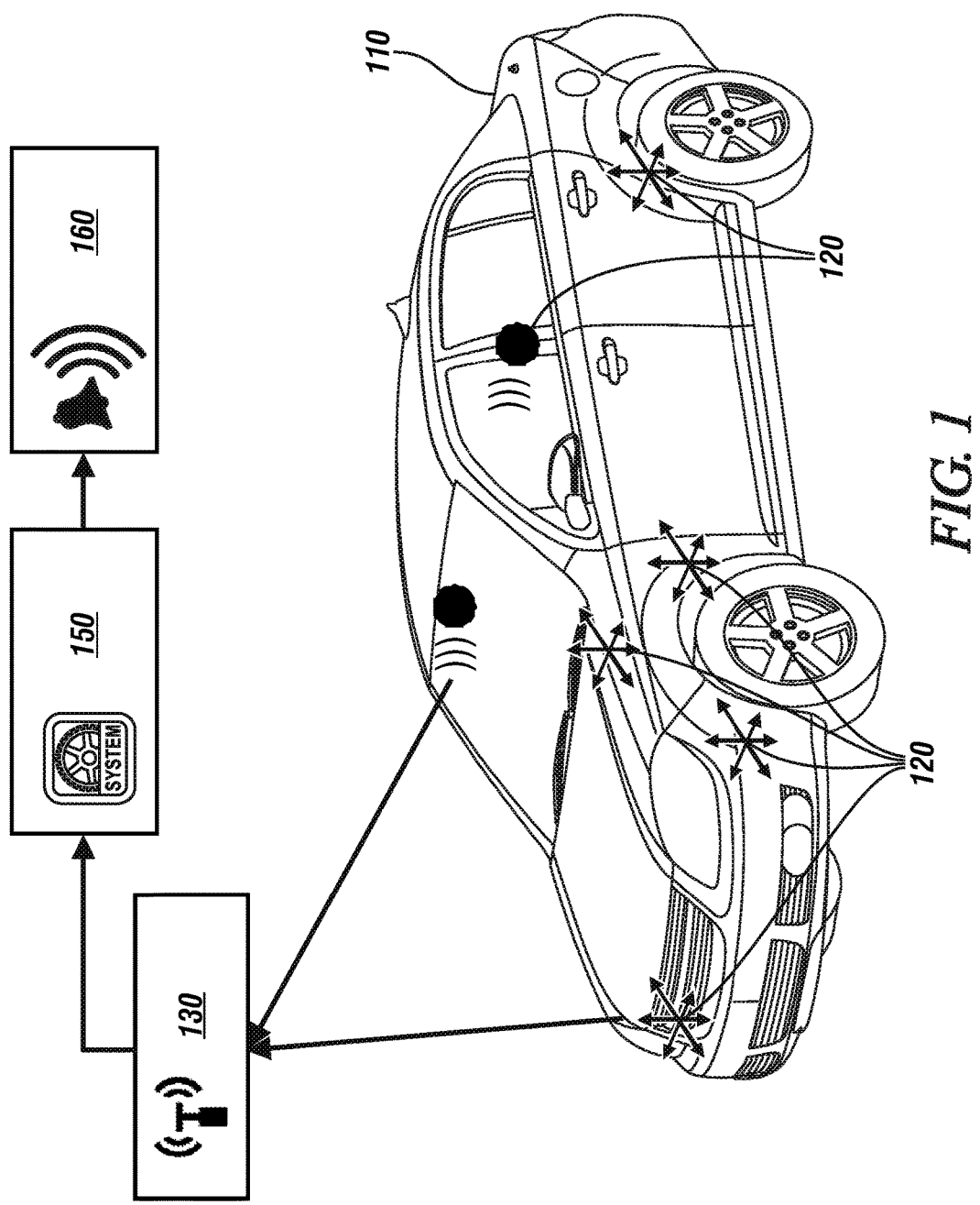
FIG. 1 illustrates an example of an autonomous health check system for a vehicle.

The following description is merely exemplary in nature and is not intended to limit the present disclosure, its application, or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The technical solutions described herein facilitate an autonomous health check of a vehicle, such as an automobile, a truck, a boat, or any other vehicle. The vehicle may be an autonomous vehicle, a partially autonomous vehicle, or a non-autonomous (human-controlled) vehicle. The autonomous health check includes monitoring and analyzing a noise and vibration status of the vehicle for diagnosing and detecting a performance issue, or condition with the vehicle. The autonomous health check facilitates detecting and analyzing noises such as a road noise, a wind noise, a powertrain noise, a squeak noise, a rattle noise, and/or other such different types of noises. For example, the noise(s) experienced in the vehicle and/or emanated by the vehicle may be recorded, such as using microphones or any other audio capturing apparatus. The autonomous health check further includes detecting and analyzing vibration levels of the vehicle. For example, the vibration experienced by an occupant of the vehicle, or one or more components of the vehicle, may be recorded using vibration-sensing apparatus, such as accelerometers, gyroscopes, position sensors, displacement sensors, or any other sensors. The autonomous health check facilitates detecting that the vehicle's noise and/or vibration performance level has surpassed a predetermined threshold. For example, surpassing the predetermined threshold indicates a degradation of performance of the vehicle or one or more components of the vehicle. The predetermined threshold(s) may be based on a type of the vehicle and further may be configured for the specific vehicle. For example, a customer may change the predetermined threshold performance level with which the noise and vibration measurement data from the vehicle is compared. For example, in case the customer is a fleet manager/owner, the customer may have a predetermined performance level set for each vehicle in a fleet of vehicles. Alternatively or in addition, for example, if the customer is an owner of a single vehicle, the customer may use a specific performance level according to the customer's preference. Alternatively or in addition, the manufacturer of the vehicle may setup the predetermined threshold levels of the vehicle.

In case the autonomous health check system determines that the recorded noise and vibration measurements indicate a degraded performance of the vehicle, the autonomous health check may transmit a notification of the problem. The notification may be transmitted to the operator, such as manager/owner of the vehicle. Alternatively or in addition, the autonomous health check system may transmit a notification to the vehicle that causes the vehicle to proceed to a service facility. For example, in case the vehicle is part of an autonomous fleet the notification facilitates the fleet manager/owner to prevent selection of a specific vehicle for use if the vehicle is associated with degraded noise and vibration performance. Alternatively or in addition, the customer may be notified of needed service. Thus, in case of a fleet of vehicles, such as a fleet of autonomous vehicles, or rental vehicles, (wherein an occupant, such as a renter, is not assured the same vehicle for each use) the technical solutions described herein facilitate the occupant to experience a consistent performance level of the vehicle. For example, the fleet owner/manager may specify a branded noise and vibration performance for each vehicle in a fleet. The consistent experience across the fleet facilitates the fleet owner/manager to avoid potential customer dissatisfaction by preventing vehicles with degraded performance from remaining in service.

Alternatively or in addition, if the vehicle is an autonomous vehicle, the transmission of the notification may cause the vehicle to navigate autonomously to a service station. Alternatively yet, in response to the notification of a degraded noise and vibration performance of the vehicle, the customer may determine a designated route for the vehicle to minimize exposure to additional degradation of the vehicle's performance.

An autonomous health check system may check the health of the vehicle as described herein. The autonomous health check system may be installed in the vehicle itself, or may be at a remote location. For example, the autonomous health check system may include a server that receives sensor measurements, such as the noise and vibration measurements, recorded in the vehicle. The vehicle may be equipped with the sensors, which may transmit the recorded data to the server. Alternatively or in addition, the autonomous health check system may include a controller equipped in the vehicle that accumulates the measurements from the sensors in the vehicle, and transmits the measurements to the server for further analysis for diagnosing the health status of the vehicle. Alternatively or in addition, the controller in the vehicle may analyze the recorded measurements for diagnosing the health of the vehicle. The autonomous health check system may further include the sensors used to record the measurements of the vehicle. For example, the sensors may include accelerometers, microphones, gyroscopes, inertia measurement devices, displacement or force transducers, or any other sensors. The sensors may be located in specific positions in and/or out of the vehicle. The sensors may be tailored for diagnosing specific noise and vibration performance levels that are associated with degraded performance of the vehicle. For example, the sensors may include microphones that are located to detect degraded powertrain isolation or elevated sound pressure levels, such as noise, which may be caused by road, wind, components of the vehicle, or a combination thereof. Alternatively or in addition, the sensors may include sensors that are located to detect vibration due to mechanical issues, such as a powertrain malfunction, a transmission malfunction, a tire failure, or a malfunction of any other component of the vehicle requiring inspection. The powertrain may be powered by gasoline, diesel, electric, fuel cell, or a combination thereof. The component of the vehicle requiring inspection may be an electrical, mechanical, or electro-mechanical component, such as electrical pump, motor, actuator, or other component that causes noise and/or vibration.

FIG. 1 illustrates an example of a health check system 150 that analyzes the health of a vehicle 110. The health check system 150 may be autonomous, that is it may operate without human intervention, such as in a preprogrammed manner. For example, the health check system 150 receives sensor data from a sensor controller 130. The sensor controller 130 may transmit the sensor data recorded by sensors 120. The health check system 150 analyzes the sensor data, such as by comparing with predetermined performance data, to diagnose if the vehicle 110 requires inspection, such as a degradation of performance. Based on the analysis, the health check system 150 transmits a notification to a notification apparatus 160.

The vehicle 110 may be any vehicle such as an automobile (for example, a car, and a truck), a boat, an all-terrain vehicle, or any other type of vehicle. The vehicle may further be classified according to a size of the vehicle, such as a full-size vehicle, a mid-size vehicle, a compact vehicle, or any other categorization. The vehicle 110 may further be classified according to features of the vehicle 110, such as a base model vehicle, mid-level model vehicle, a high-level model vehicle, a luxury model vehicle, and so on. Of course, other categorization of the vehicle 110 is possible as will be understood by a person skilled in the art.

The sensors 120 include one or more sensors of different types. For example, the sensors 120 include one or more vibration sensors, which measure vibration performance data of the vehicle 110. For example, the vibration sensors may be accelerometers, which measure the vibration by measuring proper acceleration ("g-force"). Each accelerometer may measure the corresponding proper acceleration along one or more axes, X, Y, and/or Z. The accelerometer may measure magnitude and direction of the proper acceleration as a vector quantity, and thus may provide orientation data of the vibrations experienced by the accelerometer. The sensors 120 are located inside/outside the vehicle so as to detect vibrations proactively before an occupant of the vehicle experiences the vibration. For example, the vibration detected by the sensors 120 may be smaller than a level that a human occupant may be able to detect, and thus provide an early detection of the condition with the vehicle 110. For example, the vibration sensors may be located on the seat tracks of the vehicle 110, thus detecting a vibration experienced by an occupant on respective seats. Alternatively or in addition, the vibration sensors may be in communication with the seat tracks. The vibration sensors may be in communication with any of the one or more seat tracks of the vehicle 110. For example, the vibration sensors may be in communication with driver's seat track, the front passengers' seat track, or a rear passenger's seat track. The vibration sensors may further be located to detect vibrations along a steering column of the vehicle, for example locating the vibration sensors on the steering wheel, or the steering wheel column. Alternatively or in addition, the vibration sensors may be in communication with the steering column. The vibration sensors may detect vibrations experienced by the occupants because of a degradation of a vehicle system or components including but not limited to tire and wheel, suspension, steering, powertrain, driveline, or any other component of the wheel assembly.

The sensors 120 may further include sound pressure measuring sensors, such as microphones, which convert sound pressure levels into electrical signals. The microphones may record sound from inside and/or outside a cabin of the vehicle 110. In the present disclosure inside the vehicle, or cabin, refers to the seating area of the vehicle 110, where the one or more occupants of the vehicle are seated when operating the vehicle. The sensors 120 include sensors, which may be located inside the cabin, as well as sensors, which may be located outside the cabin. For example, one or more of the microphones may be located inside the cabin, such as in proximity to an ear of the one or more occupants. For example, one or more microphones may be in communication with a seat, or located on a seat, such as at the top, or a predetermined distance from, one of the top edges of the seat or in a headrest. Such a microphone may record sound that an occupant of the vehicle may experience. Additionally or alternatively, the sensors 120 include microphones that are in communication with, or located near other components inside the vehicle, such as a rearview mirror, the steering wheel, the gearbox, or any other component inside the cabin. The sensors 120 further include microphones that are in communication with, or located outside the cabin, such as near the suspension system, tire, driveline, powertrain, under the hood, or any other location of the vehicle.

The health check system 150 analyzes the data from the sensors 120 to identify and report vehicle performance data. For example, the one or more vibration sensors may be located at a corner of the vehicle, such as on a suspension or chassis related component. Such vibration sensors may facilitate detection of a tire related condition such as an out of balance tire, a flat tire, and degraded treads of the tire, among others. The vibration data may further facilitate monitoring of the suspension system, such as a loss of road isolation, which may be caused by damaged or worn out suspension and/or chassis related isolation mechanisms (bushings, ball joints, mounts, absorbers etc.) or cradle bushings. The vibration data may alternatively, or in addition, facilitate detection of conditions associated with a chassis, powertrain, driveline, or any other component of the vehicle 110. For example, the vibration data may facilitate detection of a loss of powertrain or driveline isolation, which may be caused by damaged or worn out powertrain mounts or bushings.

The sensor controller 130 may accumulate the data recorded by the one or more sensors 120 and transmit them to the health check system 150. The sensor controller 130 may be electronic circuitry, such as a processing unit coupled with memory and communication interface(s). The sensor controller 130 may communicate with the health check system 150 in a wired or a wireless manner. In an example, the sensor controller 130 may be part of the health check system 150, such as if the health check system is equipped on the vehicle 110. Alternatively, the health check system 150 may be remotely located, and the sensor controller 130 may transmit the sensor data to the health check system 150 wirelessly, such as via a Long-Term Evolution (LTE) network, or any other wireless network. The health check system 150 may be a cloud-based system. The sensor controller 130 may communicate the sensor data using one or more communication protocols such as High Speed Packet Access (HSPA), or any other communication protocol. The sensor controller 130 may accumulate the sensor data from the one or more sensors 120 and store the sensor data for a predetermined duration, such as a day, a week, three months, six months, or any other duration. The sensor controller 130 may store the sensor data in a data repository, which is accessible by the health check system 150. In an example, the data repository may be part of the health check system 150.

Additionally or alternatively, the health check system 150 receives and analyzes the microphone data from the vehicle 110. For example, the health check system 150 identifies a specific squeak, or rattle, from the data accumulated by the microphones. The health check system additionally, or alternatively, identifies wind noise, or rush issues with the vehicle 110 from the accumulated microphone data. Further, the health check system 150 analyzes the microphone data to identify road noise such as booms (drumming), tones, and other such exterior noise.

While the health check system 150 may analyze the sensor data in isolation, such as analyzing vibration data separately from the microphone (or noise) data, the health check system 150, in addition, may analyze the data from the different sensors 120 cumulatively. For example, the health check system 150 analyzes both the vibration data and the noise data to identify booms, which may be low frequency or low-pitched noise accompanied by vibration. The health check system 150 may analyze the sensor data to identify different types of noise and vibration that an occupant of the vehicle 110 may experience when the vehicle 110 is in operation. The health check system 150 identifies and categorizes the noise and vibration data to identify the different performance levels of the vehicle 110 autonomously. By continuously monitoring the performance levels of the vehicle 110 and by comparing the performance levels with predetermined performance levels, the health check system 150 proactively diagnoses degradation in the performance of the vehicle 110. In response to identifying degradation, the health check system 150 notifies the notification apparatus 160 to facilitate a servicing of the vehicle 110. Additionally or alternatively, the health check system 150 facilitates warning the driver/passenger/fleet owner of the vehicle 110.

The notification apparatus 160 may be a communication apparatus that receives the notification from the health check system 150. The notification apparatus 160 may be electronic circuitry that includes a processing circuitry, a memory, and a communication interface, among other components. For example, the notification apparatus 160 may be a phone, a tablet computer, a laptop computer, a desktop computer, a server computer, or any other communication apparatus. In an embodiment, the notification apparatus 160, upon receiving the notification from the health check system 150, prompts the owner/manager of the vehicle 110. The owner/manager of the vehicle 110 may or may not be an occupant of the vehicle. The vehicle 110 may be part of a fleet of vehicles that is owned/operated by an entity different from the occupant. For example, the vehicle 110 may be a rented, or a ride-share vehicle. Alternatively or in addition, the vehicle 110 may be an autonomous vehicle that is rented or ride-shared. Accordingly, in such cases, the health check system 150 transmits the notification to the notification apparatus of the owner/manager as may be configured in the health check system 150. In case the owner/manager of the vehicle 110 is an occupant of the vehicle 110, the health check system 150 transmits the notification to the owner/manager, who is also an occupant. The owner/manager, upon receiving the notification may take the vehicle 110 to a service facility.

In another example, if the vehicle 110 is an autonomous vehicle, the notification apparatus 160 may be a part of the vehicle 110. The notification apparatus 160 may communicate with a controller of the autonomous vehicle. In such a case, the health check system 150 notifies the notification apparatus 160 to cause the controller of the autonomous vehicle to navigate the autonomous vehicle to a service facility. For example, the health check system 150 may identify the nearest service facility, such as based on current location of the vehicle 110 and a data repository of service facilities. The health check system 150 may provide the service facility location (address, coordinates etc.) to the notification apparatus 160 causing the autonomous vehicle to navigate to the service facility. The health check system 150 may include the service facility information even if the vehicle 110 is not an autonomous vehicle.

The health check system 150, thus, receives the sensor data from the sensor controller 130, analyzes the received sensor data, and notifies the notification apparatus 160 upon detecting a service issue. The health check system 150 may send a status report to the notification apparatus 160 even if a service issue is not detected. For example, the health check system 150 may send a periodic health report to the notification apparatus 160, which includes diagnostic information of the vehicle 110. For example, the health check system 150 may send the health report every three months, every six months, every month, or at any other frequency. The health check system 150 may send the health report on demand, such as upon receiving a request for the health report. For example, the owner/manager of the vehicle 110, via the notification apparatus 160, may send a request for the health report. The health check system 150, in response to the request, may access accumulated sensor data over a predetermined duration. Alternatively, or in addition, the health check system 150 requests the sensor controller 130 to collect sensor data from the one or more sensors 120 for generating the health report. In an example, the health check system 150 may access or request the sensor controller 130 to collect sensor data from a subset of the one or more sensors 120. For example, the sensor controller 130 may collect sensor data only from the sensors that are located in proximity to a driver seat in the vehicle 110, or only from the sensors inside the cabin of the vehicle 110, or only from the sensors outside the cabin of the vehicle 110.

Alternatively or in addition, the health check system 150 may access or request sensor data from a subset of sensors that are associated with specific components of the vehicle 110. For example, the subset of sensors may include one or more sensors associated with the seat tracks. The subset of sensors may include one or more sensors associated with the powertrain. The subset of sensors may include one or more sensors associated with the driveline. The subset of sensors may include one or more sensors associated with the tires. The subset of sensors may include one or more sensors associated with the suspension, or any other such components of the vehicle 110. The sensor data from the subset of sensors that are associated with specific components may be analyzed along with one or more of the vibration data and the microphone data to diagnose a vehicle condition and provide a notification regarding the diagnosed vehicle condition.

Figure 2:
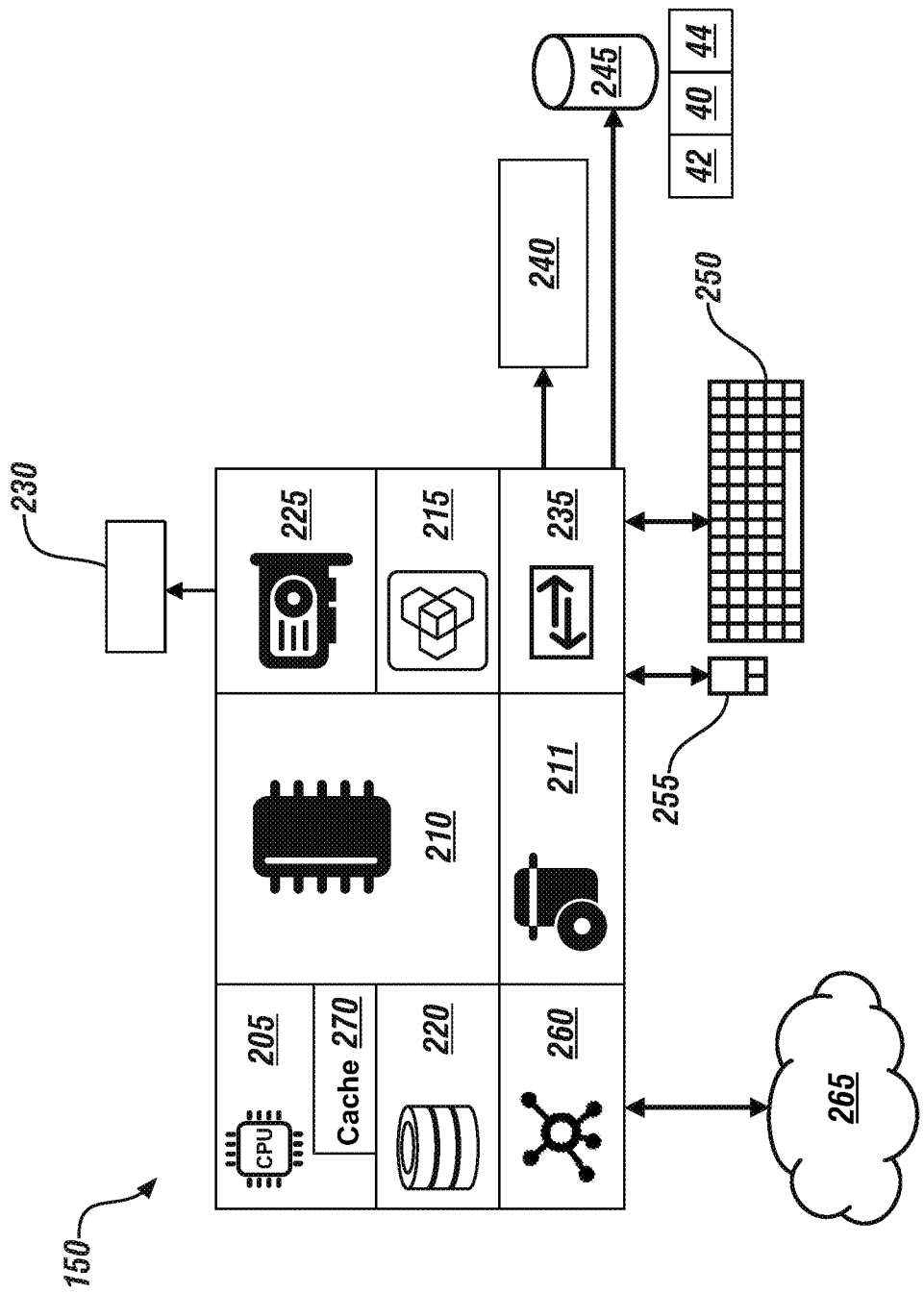
FIG. 2 illustrates example components of an autonomous health check system for a vehicle.

FIG. 2 illustrates example components of the health check system 150. The health check system 150 may be a communication apparatus, such as a computer. For example, the health check system 150 may be a desktop computer, a tablet computer, a laptop computer, a phone, such as a smartphone, a server computer, or any other device that communicates via a network 265. Alternatively or in addition, the health check system 150 may be a controller that controls the operation of an autonomous vehicle. The health check system 150 includes hardware, such as electronic circuitry.

The health check system 150 includes, among other components, a processor 205; memory 210 coupled to a memory controller 215, and one or more input devices 245 and/or output devices 240, such as peripheral or control devices that are communicatively coupled via a local I/O controller 235. These devices 240 and 245 may include, for example, battery sensors, position sensors (altimeter, GPS, and the like), indicator/identification lights, and the like. Input devices such as a conventional keyboard 250 and mouse 255 may be coupled to the I/O controller 235. The I/O controller 235 may be, for example, one or more buses or other wired or wireless connections, as are known in the art. The I/O controller 235 may have additional elements, which are omitted for simplicity, such as controllers, buffers (caches), drivers, repeaters, and receivers, to enable communications.

The I/O devices 240, 245 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 205 is a hardware device for executing hardware instructions or software, particularly those stored in memory 210. The processor 205 may be a custom made or commercially available processor, a central processing unit (CPU), an auxiliary processor among several processors associated with the health check system 150, a semiconductor based microprocessor (in the form of a microchip or chip set), a macroprocessor, or other device for executing instructions. The processor 205 includes a cache 270, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 270 may be organized as a hierarchy of more cache levels (L1, L2, and so on.).

The memory 210 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 210 may incorporate electronic, magnetic, optical, or other types of storage media. Note that the memory 210 may have a distributed architecture, where various components are situated remote from one another but may be accessed by the processor 205.

The instructions in memory 210 may include one or more separate programs, each of which comprises an ordered listing of executable instructions for implementing logical functions. In the example of FIG. 2, the instructions in the memory 210 include a suitable operating system (OS) 211. The operating system 211 essentially may control the execution of other computer programs and provides scheduling, input-output control, file and data management, memory management, and communication control and related services.

Additional data, including, for example, instructions for the processor 205 or other retrievable information, may be stored in storage 220, which may be a storage device such as a hard disk drive or solid state drive. The stored instructions in memory 210 or in storage 220 may include those enabling the processor to execute one or more aspects of the systems and methods of this disclosure.

The health check system 150 may further include a display controller 225 coupled to a user interface or display 230. In some embodiments, the display 230 may be an LCD screen. In other embodiments, the display 230 may include a plurality of LED status lights. In some embodiments, the health check system 150 may further include a network interface 260 for coupling to a network 265. The network 265 may be an IP-based network for communication between the health check system 150 and an external server, client and the like, such as the notification apparatus 160 and the sensor controller 130, via a broadband connection. In an embodiment, the network 265 may be a satellite network (i.e. OnStar). The network 265 transmits and receives data between the health check system 150 and external systems. In some embodiments, the network 265 may be a managed IP network administered by a service provider. The network 265 may be implemented in a wireless fashion, for example, using wireless protocols and technologies, such as Wi-Fi, WiMAX, satellite, or any other. The network 265 may also be a packet-switched network such as a local area network, wide area network, metropolitan area network, the Internet, or other similar type of network environment. The network 265 may be a fixed wireless network, a wireless local area network (LAN), a wireless wide area network (WAN) a personal area network (PAN), a virtual private network (VPN), intranet or other suitable network system and may include equipment for receiving and transmitting signals.

The notification apparatus 160 and the sensors controller 130 may also include components similar to those illustrated in FIG. 2.

Figure 3:
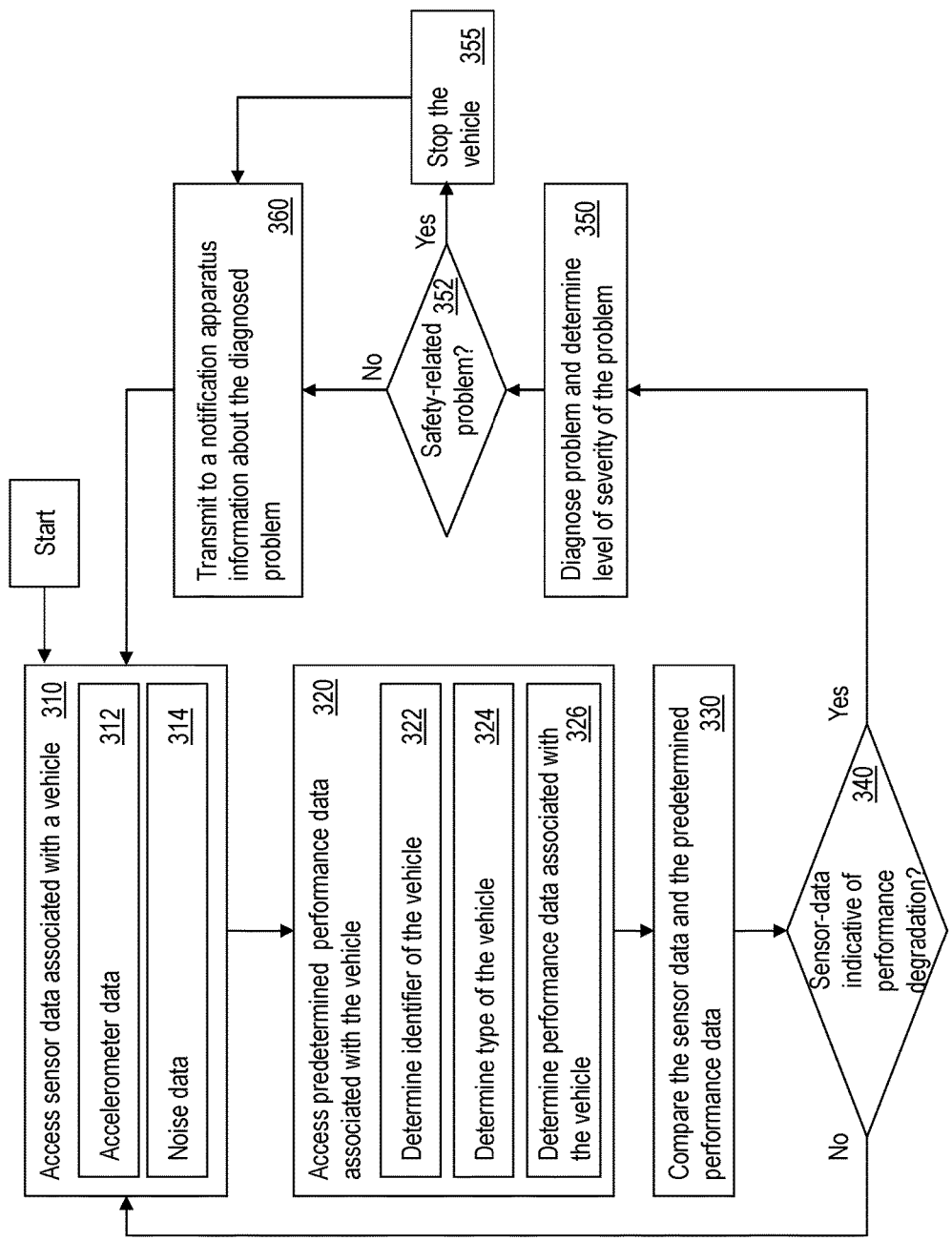
FIG. 3 illustrates a flowchart of an example method of autonomously monitoring the health of a vehicle.

FIG. 3 illustrates a flowchart of an example method of autonomously monitoring the health of the vehicle 110. The health check system 150 accesses sensor data associated with the vehicle 110, as shown at block 310. For example, the sensor data may include vibration data and noise data accumulated by the sensors 120 of the vehicle 110, as shown at blocks 312 and 314. For example, the health check system 150 accesses the sensor data via the data repository in which the sensor controller 130 stores the accumulated sensor data. Alternatively or in addition, the health check system 150 receives the sensor data from the sensor controller 130. Alternatively or in addition, the health check system 150 receives the sensor data from the sensors 120 directly. The sensor data may additionally include a location at which the sensors 120 collected the sensor data. For example, the sensor controller 130 may add the location information when storing the sensor data from the sensors 120. The sensor data may further include a timestamp that identifies the time at which the sensors collected the sensor data. For example, the sensor controller 130 adds the timestamp information to the sensor data collected by the sensor 120.

Table 1 illustrates example sensor data that includes a vehicle identifier, a sensor identifier, a timestamp, a location, and a sensor measurement, among other data in an entry of the sensor data. The vehicle identifier is a unique identifier associated with the vehicle 110, which the health check system 150 uses to differentiate the vehicle 110 from other vehicles that the health check system 150 monitors. For example, the vehicle identifier may be a vehicle identification number (VIN) associated with the vehicle, or any other identifier that the health check system 150 generates for the vehicle 110. The sensor identifier is a unique identifier associated with each sensor in the vehicle 110. The health check system 150 uses the sensor identifier to differentiate a sensor from other sensors. The sensor identifier may further identify a location of the corresponding sensor on the vehicle 110. For example, a sensor located in the seat track may be identified by a first identifier (for example 1), while a sensor located in the suspension system may be identified by a second identifier (for example, 2). The identifiers may use a different format or scheme than the example provided here. The timestamp and the location data in the sensor data may identify the time and location at which the corresponding sensor collected the sensor measurement.

The sensor data may have additional or fewer data elements than the example in Table 1. In one or more examples, a data point in the sensor data, may include full vehicle CAN bus traffic, which includes data from all sensors and systems on the vehicle 110. As such, it could be determined exactly what condition the vehicle was experiencing when the noise and vibration data was recorded based on the CAN bus traffic. For example, if a large excursion was noted from an accelerometer, camera data could be accessed to comprehend and help identify if the vehicle hit a large object to cause a failure of a component.

TABLE 1

| Vehicle Identifier | Sensor Identifier | Timestamp | Location (Latitude, Longitude) | Sensor Measurement |
| --- | --- | --- | --- | --- |
| XX1 | S-1 (seat track) | 2012 Oct. 3 03:00:03 | 40.71, −74.00 | 1.6 |
| XX1 | S-2 (front passenger tire) | 2012 Oct. 3 03:00:03 | 40.71, −74.00 | 3.1 |
| XX1 | S-3 (steering) | 2012 Oct. 3 03:00:03 | 40.71, −74.00 | 1.5 |

Referring again to FIG. 3, the health check system further accesses predetermined performance data associated with the vehicle 110, as shown at block 320. The health check system 150 accesses the predetermined performance data from a data repository, which may be the same data repository that contains the measured sensor data. Alternatively or in addition, the health check system 150 stores the predetermined performance data of the vehicle 110. Accessing the predetermined performance data may include the health check system 150 determining the vehicle identifier, as shown at block 322. The health check system 150 may use the vehicle identifier to identify the type of vehicle 110, as shown at block 324. For example, the type of the vehicle 110 may identify the vehicle 110 as a luxury vehicle, a base model vehicle, a sports vehicle, a compact vehicle, or any other type of vehicle. The different types of vehicle may have respective drive performance, and accordingly respective performance data. For example, the luxury vehicle may have a smoother ride, with lesser vibrations and/or noise transmitted to the cabin for the occupants to experience, in comparison to the base model. In one or more examples, the sports model may have a performance data that facilitates a more sportier ride for the occupants in comparison to the luxury vehicle. For example, the sports model may have specific noise performance data may include facilitate higher values of noise of the vehicle 110 to be experienced by the occupants than the luxury vehicle, but a similar vibration data performance as that of the luxury vehicle. It is understood that in other examples, the performance data of the different types of vehicles may be different than the above listing. The health check system 150 further determines the performance data associated with the vehicle 110, as shown at block 326. For example, the performance data may be identified using the vehicle identifier. Alternatively or in addition, the health check system 150 determines the performance data based on the type of the vehicle identifier. The predetermined performance data may include predetermined vibration performance data, and may further include predetermined noise performance data.

The health check system 150 compares the accessed sensor data and the predetermined performance data, as shown at block 330 and compares sensor data collected by the sensors 120 of the vehicle 110 and the predetermined performance data that is specifically associated with the vehicle 110. For example, the vibration data from the sensors 120 may be compared with the predetermined vibration performance data and the noise data from the sensors 120 may be compared with the predetermined noise performance data. The predetermined performance data may be different for different vehicles. For example, the predetermined performance data of a first vehicle, which may be a base model-type vehicle, may be different from a second vehicle, which may be a luxury-type vehicle. Thus, the predetermined performance data may vary according to the type of the vehicle 110.

In addition, or alternatively, the predetermined performance data may vary according to vehicle type. For example, the owner/manager of the vehicle 110 may prefer a particular performance level from the vehicle 110. The owner/manager may, accordingly, specify the predetermine performance data for the vehicle 110. For example, the owner/manager of a first vehicle may prefer a sportier driving experience and the vibration and noise performance data of the first vehicle may be configured accordingly. An owner/manager of a second vehicle may prefer a smoother driving experience and the vibration and noise performance data of the second vehicle may be configured accordingly; distinct from that of the first vehicle.

Figure 4:
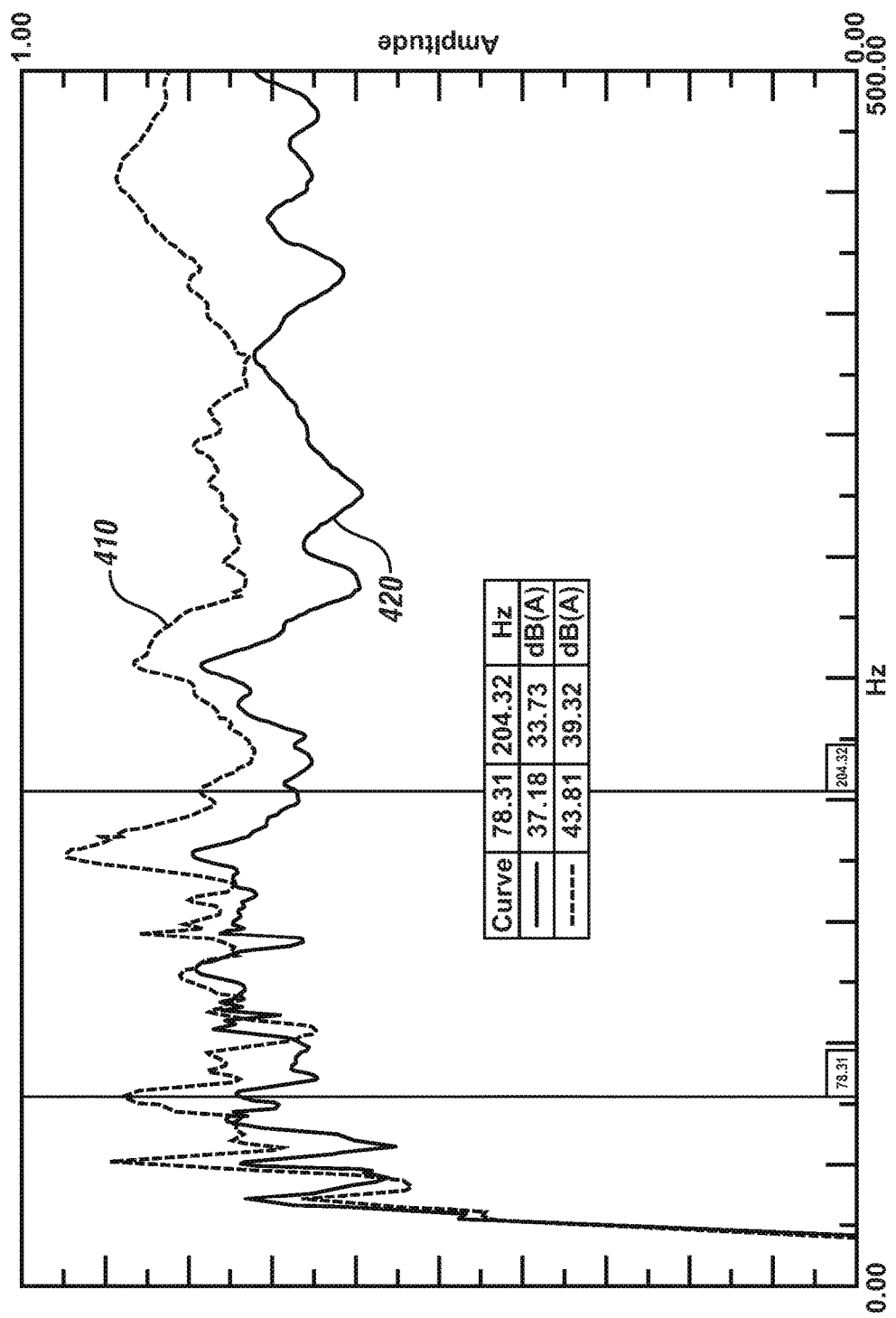
FIG. 4 illustrates an example comparison of sensor data and predetermined performance data for autonomously monitoring the health of a vehicle.

FIG. 4 illustrates an example comparison of the sensor data and the predetermined performance data. In the illustrated example, the sensor data represented by curve 410 illustrates a degraded noise performance, indicating that the vehicle requires servicing. Further, curve 420 represents the predetermined performance data that the gray colored curve 410 is compared with to identify that the servicing is required. While, FIG. 4 illustrates comparison of noise data and predetermined noise data, a comparison of vibration data and predetermined vibration data can be performed in one or more examples.

The health check system 150, based on the comparison of the accessed sensor data of the vehicle 110 and the predetermined performance data of the vehicle 110, determines if the performance of the vehicle 110 has degraded, as shown at blocks 340 and 350. In case the performance has not degraded, that is, the vehicle 110 is operating at least at the predetermined performance, the health check system 150 continues monitoring the health of the vehicle 110. The health check system 150 may generate and transmit a health report that indicates that there is no problem detected with the performance of the vehicle 110. If the health check system 150 detects a degraded performance, the health check system 150 attempts to diagnose the problem of the vehicle, as shown at block 350. The health check system 150 also determines a severity of the diagnosed problem, as shown at block 350. For example, different problems with the vehicle 110 maybe categorized into separate severity categories. The categories may include a safety-related problem category. In case of a safety-related problem being detected, the health check system 150 stops the vehicle 110, as shown at blocks 352 and 355. For example, if the vehicle 110 is an autonomous vehicle, the health check system 150 transmits an executable instruction to the vehicle 110 to move the vehicle to the closest safe-zone, such as a shoulder or a side of the road, and turn the vehicle 110 off.

The health check system 150 further transmits a notification to the notification apparatus 160, as shown at block 360. The notification is sent regardless of the severity level of the problem detected. In case the vehicle 110 has been stopped due to a safety-related problem, the notification may include a location at which the vehicle 110 was stopped. The notification may include the diagnosis information. The notification may further include a location of one or more service facilities for servicing the vehicle 110. In addition, the notification may include severity information that may identify a functional safety issue. For example, the notification may denote the problematic condition of the vehicle as requiring immediate attention if the health check system 100 identifies that the problematic condition raises a safety issue. The notification may denote the problematic condition being not severe if the health check system 100 identifies that the problematic condition raises a vehicle satisfaction condition.

Figure 5:
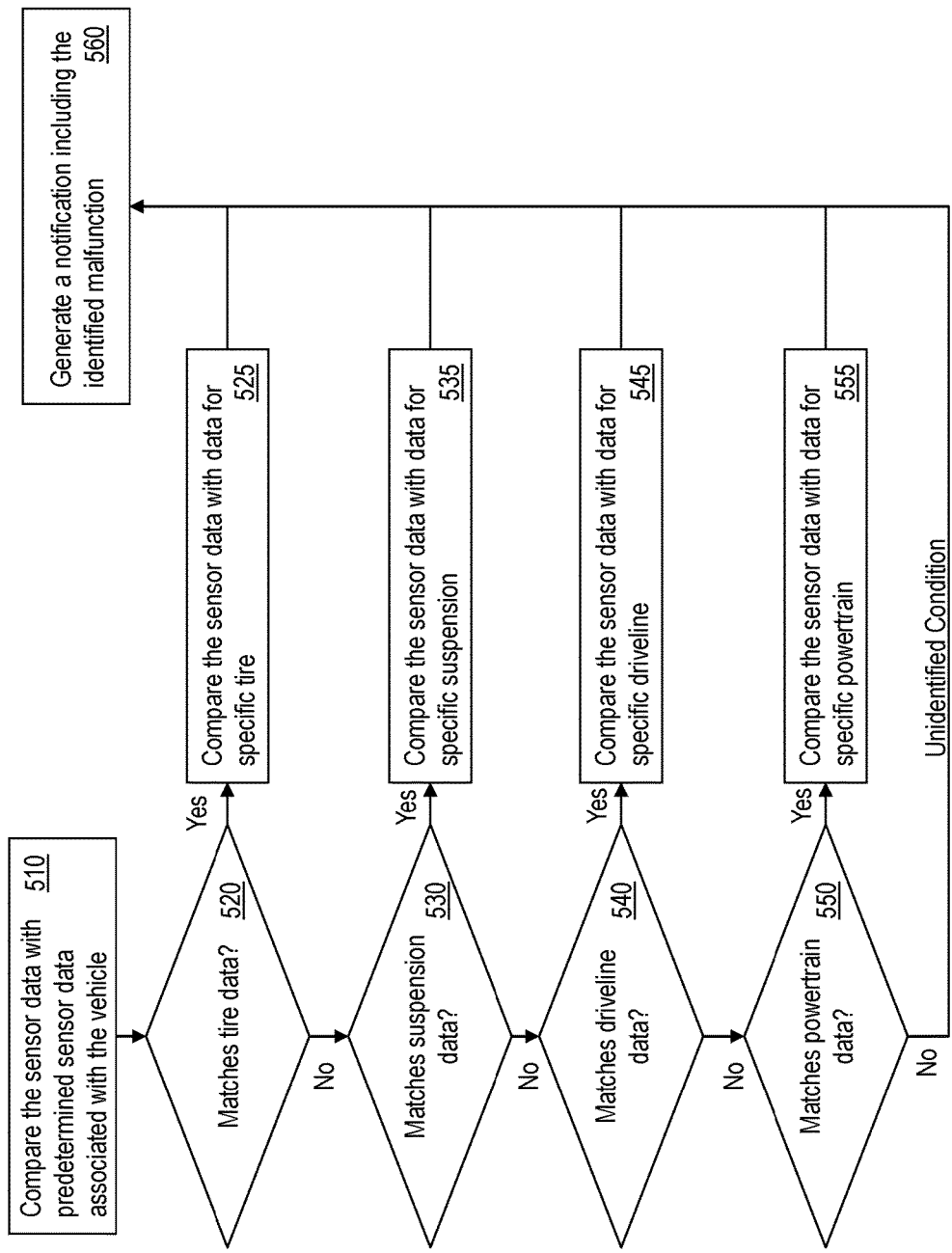
FIG. 5 illustrates a flowchart of an example method for autonomously diagnosing a problem detected by a vehicle health check system.

FIG. 5 illustrates a flowchart of an example method for autonomously diagnosing the problem detected by the health check system 150. The health check system 150 may use the method to diagnose the problem at block 350 of FIG. 3. For example, the health check system 150, upon detecting that the performance of the vehicle has degraded in comparison to the predetermined performance data, compares the sensor data with predetermined sensor data associated with the vehicle 110, as shown at block 510. The predetermined sensor data may include sensor data when the vehicle 110 was previously diagnosed with a service issue. Alternatively or in addition, the predetermined sensor data may include sensor data from other vehicles or simulated data that is indicative of a specific service requirement of vehicle 110 or a component thereof. For example, the predetermined sensor data may include validated data that is indicative of a tire, a suspension, a driveline, or a powertrain service requirement. For example, the validated data may be measured at strut top mounts, lower control arms, body or chassis structure, or any other component of the vehicle 110. In one or more examples, the performance data is stored locally on the vehicle 110 itself, and accessible by the health check system 150. Alternatively or in addition, the predetermined sensor data may include sensor data indicative of a healthy vehicle, which does not have any known problem. If the comparison with the predetermined sensor data is indicative of a problem as described earlier, the health check system 150 identifies a specific problem by comparing the sensor data with specific predetermined data as illustrated further in FIG. 5 and described below. It is understood that the specific problem detection may be performed sequentially or in parallel; in other words, the health check system 150 may analyze the sensor data for identifying a specific problem one at a time, or analyze the sensor data to identify two or more specific problems concurrently.

In an exemplary embodiment, the health check system 150 determines if the sensor data is indicative of a tire service requirement as shown at block 520. To this end, the health check system 150 analyzes the sensor data, including the vibration and/or noise data accumulated by the one or more sensors that are associated with the tires of the vehicle 110. For example, as described herein, the health check system 150 identifies the subset of one or more sensors that are associated with the tires of the vehicle 110, based on the vehicle identifier and the sensor identifier. The health check system 150 compares the sensor data from the identified subset of sensors with predetermined threshold data associated with the tires. If the predetermined threshold data is surpassed (above/below) the health check system 150 may determine that there is a service requirement for the tires of the vehicle, and further analyze the sensor data to identify a specific tire requirement, as shown at block 525. For example, the health check system 150 determines that one or more of the tires is out of balance, is flat, has degraded treads, or the like. The health check system 150 accesses validated sensor data for each of the specific tire related issues, and compares the sensor data with the stored data to identify a match.

Similarly, the health check system 150 may determine if the sensor data is indicative of a suspension service requirement, as shown at block 530 by comparing sensor data from a subset of sensors associated with the suspension with predetermined threshold values of the suspension data for the vehicle 110. If a suspension related service requirement exists, the health check system 150 further analyzes the sensor data by comparing the sensor data with validated suspension data to identify the specific suspension issue, as shown at block 535. For example, the health check system 150 identifies if the vehicle is operating or a damaged or worn suspension, damaged or worn cradle bushings, or the like.

Further, the health check system 150 may determine if the sensor data is indicative of a driveline service requirement by comparing the sensor data from a subset of sensors associated with the driveline of the vehicle with predetermined thresholds associated with the performance of the driveline, as shown at block 540. If a driveline related service requirement exists, the health check system 150 further analyzes the sensor data by comparing the sensor data with validated driveline performance data, as shown at block 545. For example, the health check system 150 identifies if the vehicle is operating with a driveline isolation, which may be caused by damaged or worn mounts or bushings.

Further, the health check system 150 determines if the sensor data is indicative of a service requirement by comparing the sensor data from a subset of sensors associated with the powertrain of the vehicle with predetermined thresholds associated with the performance of the driveline, as shown at block 550. If a powertrain related service requirement exists, the health check system 150 further analyzes the sensor data by comparing the sensor data with validated powertrain performance data, as shown at block 555. For example, the health check system 150 identifies if the vehicle is operating with the powertrain malfunctioning. It is understood that the health check system 150 can identify other or additional specific problems with the vehicle 110 than those illustrated and described herein. For example, the health check system 150 may identify interior noise performance (wind noise or Squeak and Rattle issues etc.) among other problems.

The health check system 150 identifies the specific issue diagnosed in the notification sent to the notification apparatus 160, as shown at block 560. In case the health check system 150 is unable to diagnose a specific problem with the vehicle, the notification apparatus 160 is alerted accordingly.

The signal to the notification apparatus 160 may cause the vehicle to navigate to a service facility, such as a service facility identified in the signal. For example, the health check system 150 includes in the notification a command for an autonomous vehicle to navigate to an identified service facility. Thus, the health check system 150 facilitates determining whether noise and vibration performance sensor data is acceptable for the vehicle 110, and if acceptable then continuing use of the vehicle 110; if unacceptable, then returning the vehicle 110 for service in case of an autonomous vehicle. The notification, in another example, may be sent to an owner/manager of the vehicle 110, the message indicating that the vehicle 110 requires servicing in case the vehicle 110 is not autonomous.

The technical solutions described herein facilitate proactively diagnosing and servicing a vehicle. The technical solutions may further improve autonomous vehicles where ownership is less likely. As described herein, the technical solutions facilitate automatically evaluating noise and vibration performance of a vehicle and determining if the vehicle is performing at a predetermined level (which may be a manufacturer specific or a customer specific performance level), and determining if the vehicle is to be serviced. The technical solutions send notifications, which may result in an autonomous vehicle being navigated to a service facility for servicing or other actions based on the severity of the measured data in comparison to known performance data. The technical solutions facilitate identifying degradation in performance and identifying the service requirements of the vehicle based on evaluation of noise and vibration data from sensors equipped inside/outside of the vehicle cabin. The system accumulates road noise vibration levels, wind noise levels, powertrain/chassis noise and vibration levels, and the like.

The technical solutions accordingly provide autonomous monitoring of the health of the vehicle, before an owner/manager/occupant of the vehicle complains or identifies a degraded performance of the vehicle based on noise and vibration or before a component fails to the extent that the failure becomes a safety issue for the occupants of the vehicle 110. The technical solutions thus facilitate providing a consistent customer-to-vehicle experience by avoiding customer exposure to degraded performing vehicles. Accordingly, the technical solutions described herein facilitate monitoring noise and vibrations associated with a vehicle, and diagnosing performance of a vehicle independent of a customer or occupant of the vehicle. The technical solutions further improve the maintenance of the vehicle by eliminating the need for a human machine interface to assess the performance of the vehicle.

In case of autonomous fleet applications, the technical solutions described herein facilitate a consistent customer experiences with vehicle noise and vibration performance. For example, an owner/manager of a fleet of vehicles may configure uniform or common (that is identical) predetermined performance levels for each of the vehicles in the fleet. Accordingly, a customer of the fleet experiences a uniform noise vibration performance irrespective of the vehicle the customer receives from the fleet. The technical solutions described herein may use sensors that are already equipped on the vehicle. Alternatively or in addition, sensors may be added to the vehicle at specific locations, such as seat track, pedals, mirrors, steering wheel, and other locations, which may be adjacent to where occupants are seated in the vehicle.

In summary, the technical solutions facilitate a proactive diagnosis and detection of noise and vibration performance issues before a passenger of the vehicle is exposed to a degraded performance. The technical solutions thus facilitate keeping customer experiences with the vehicle positive and consistent, and moreover safe.

The present technical solutions may comprise a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, such as example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession, in fact, may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A computer-implemented method for autonomously monitoring the health of a vehicle, the computer-implemented method comprising:
   receiving vehicle sensor data comprising at least one from among vibration data of the vehicle and noise data of the vehicle, wherein the vibration data comprises measurements of vibration experienced by one or more components of the vehicle and the noise data comprises measurements of sound pressure levels associated with the vehicle, the vehicle sensor data received from a first set of sensors in the vehicle;
   accessing vehicle performance data comprising at least one from among predetermined vibration performance data of the vehicle and predetermined noise performance data of the vehicle, the vehicle performance data collected over a predetermined period of time;
   determining a difference in the received vehicle sensor data and the predetermined vehicle performance data;
   in response to the difference being indicative of a performance degradation:
      autonomously diagnosing the health of the vehicle by comparing component sensor data associated with one or more components to determine a cause of the difference based on a pattern of the received vehicle sensor data, the autonomous diagnosing comprising:
         requesting and receiving component sensor data from a second set of sensors that is associated with a specific component; and
         determining a performance degradation of the specific component by comparing the component sensor data with predetermined component performance data; and
      transmitting a notification to an autonomous vehicle controller associated with the vehicle to navigate the vehicle in response to a diagnosis of the performance degradation of the specific component.

2. The computer-implemented method of claim 1, wherein the vibration data comprises measurements from a vibration sensor mounted in communication with a seat track of the vehicle.

3. The computer-implemented method of claim 1, wherein the vibration data comprises measurements from a vibration sensor mounted in communication with one of steering wheel and a steering column of the vehicle.

4. The computer-implemented method of claim 1, further comprising detecting a tire condition based on the determined difference, wherein the predetermined vibration performance data comprises validated vibration data.

5. The computer-implemented method of claim 1, further comprising detecting a powertrain condition based on the determined difference, wherein the predetermined vibration performance data comprises validated powertrain vibration data.

6. The computer-implemented method of claim 1, wherein accessing the predetermined vibration performance data comprises:
   determining a type of the vehicle; and
   accessing the predetermined vibration performance data associated with the determined type of the vehicle.

7. The computer-implemented method of claim 6, wherein the type of the vehicle is determined based on a vehicle identifier associated with the vehicle.

8. The computer-implemented method of claim 1, wherein the notification commands the autonomous vehicle controller to navigate the vehicle to a service facility.

9. The computer-implemented method of claim 1, wherein the noise data comprises measurements from a microphone mounted in communication with a seat track of the vehicle.

10. An apparatus for autonomously monitoring the health of a vehicle, the apparatus comprising:

a memory;
a communication interface; and
a processor communicably coupled with the memory and the communication interface, wherein the processor is further configured to:
 receive vibration data of the vehicle, wherein the vibration data comprises measurement of vibration of one or more components of the vehicle, the vibration data received from a first set of sensors in the vehicle;
 access a predetermined vibration performance data of the vehicle;
 determine a difference in the received vibration data and the predetermined vibration performance data;
 in response to the difference being indicative of a performance degradation:
  autonomously diagnosing the health of the vehicle by comparing component sensor data associated with one or more components to determine a cause of the difference based on a pattern of the received vibration data, wherein for the autonomous diagnosis the processor is configured to:
   request and receive component vibration data from a second set of sensors that is associated with a specific component; and
   determine a performance degradation of the specific component by comparing the component vibration data with predetermined component vibration performance data; and
  transmit a notification to an autonomous vehicle controller associated with the vehicle to navigate the vehicle in response to a diagnosis of the performance degradation of the specific component.

11. The apparatus of claim 10, wherein the vibration data comprises measurements from a vibration sensor mounted in communication with a seat track of the vehicle.

12. The apparatus of claim 10, wherein the vibration data comprises measurements from a vibration sensor mounted in communication with a suspension of the vehicle.

13. The apparatus of claim 10, wherein the processor is further configured to detect a driveline malfunction based on the determined difference, wherein the predetermined vibration performance data comprises validated driveline vibration data.

14. The apparatus of claim 10, wherein the predetermined vibration performance data is accessed based on a type of the vehicle.

15. The apparatus of claim 10, wherein the difference is a first difference, and the processor is further configured to:
 receive noise data of the vehicle, wherein the noise data comprises measurements of noise experienced by an occupant of the vehicle;
 access a predetermined noise performance data of the vehicle;
 determine a second difference in the received noise data and the predetermined noise performance data; and
 transmit the notification in response to the first difference being indicative of the performance degradation, and the second difference being indicative of the performance degradation.

16. A computer-program product for autonomously monitoring the health of a vehicle, the computer program product comprising a non-transitory computer readable storage medium, the computer readable storage medium comprising computer executable instructions, wherein the computer readable storage medium comprises instructions to:
 receive vibration data of the vehicle, wherein the vibration data comprises measurement of vibration experienced by an occupant of the vehicle;
 access a predetermined vibration performance data of the vehicle;
 determine a difference in the received vibration data and the predetermined vibration performance data;
 in response to the difference being indicative of a performance
 degradation:
  autonomously diagnose the health of the vehicle by comparing component sensor data associated with one or more components to determine a cause of the difference based on a pattern of the received vibration data, the autonomous diagnosing comprising instructions to:
   request and receive component vibration data from a second set of sensors that is associated with specific component; and
   determine a performance degradation of the specific component by comparing the component vibration data with predetermined component vibration performance data; and
 transmit a notification to an autonomous vehicle controller associated with the vehicle to navigate the vehicle in response to a diagnosis of the performance degradation of the specific component.

17. The computer-program product of claim 16, wherein the vibration data comprises measurements from a vibration sensor and a speed of the vehicle at which the measurements are recorded.

18. The computer-program product of claim 16, wherein the difference is a first difference, and the computer readable storage medium further comprises instructions to:
 receive noise data of the vehicle, wherein the noise data comprises measurement of noise experienced by an occupant of the vehicle;
 access a predetermined noise performance data of the vehicle;
 determine a second difference in the received noise data and the predetermined noise performance data; and
 transmit the notification in response to the first difference being indicative of the performance degradation, and the second difference being indicative of the performance degradation.

19. The computer-program product of claim 18, wherein the noise data comprises noise measurements captured by a sound pressure level measurement device located inside the vehicle.

20. The computer-program product of claim 18, wherein the noise data comprises noise measurements captured by a sound pressure level measurement device located outside the vehicle.

* * * * *